3,236,195
HAY WAFERING METHOD AND APPARATUS
Stanley L. Lawrence, Livonia, Mich., assignor to Massey-Ferguson, Inc., Detroit, Mich., a corporation of Maryland
Filed Nov. 5, 1962, Ser. No. 235,469
20 Claims. (Cl. 107—14)

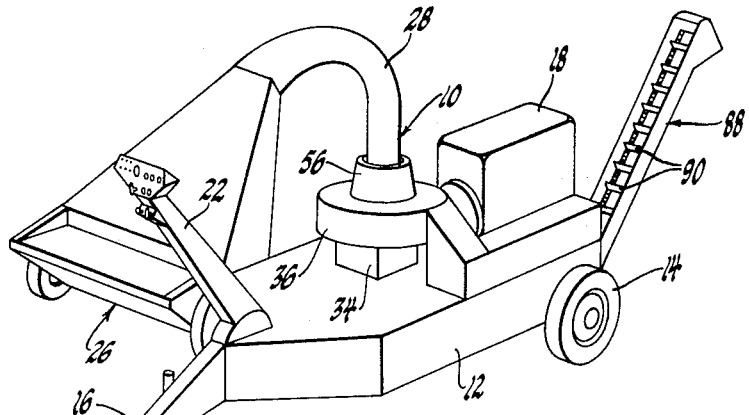
Fig. 1
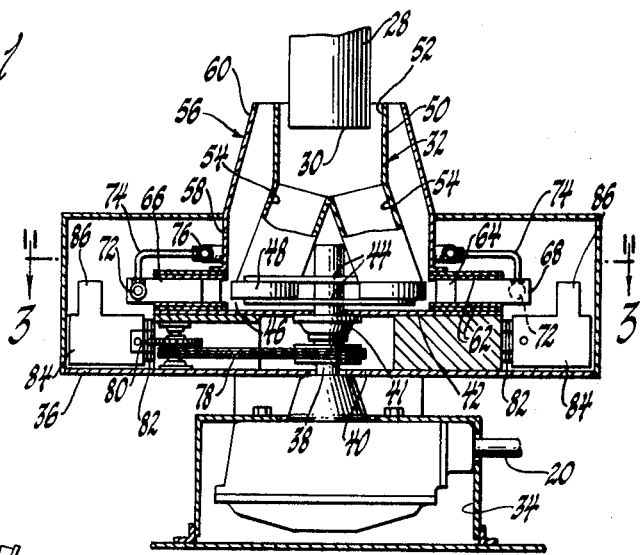
Fig. 2
Fig. 3
INVENTOR.
Stanley L. Lawrence
BY Barnard & McGlynn
ATTORNEYS United States Patent Office 3,236,195
Patented Feb. 22, 1966

This invention relates to a method and apparatus for producing hay wafers and, in particular, to a method and apparatus for field wafering forage crops into hay wafers which is particularly characterized by an improved method and means for feeding hay to the wafering apparatus.

In recent times, apparatus have been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the wafering chamber into and through the die cells to form hay wafers. A rotatable multiple flight feed auger has been disposed within an enclosing hopper having one end thereof communicating with the aforementioned chamber. A pick-up mechanism, such as of the rotary flail type including a plurality of spaced rapidly rotatable flails or arms, has been provided for picking up and delivering hay, preferably preconditioned or processed, finely chopped, mixed and blended hay from a windrow within a field, to the aforementioned hopper for feed therefrom to the wafering chamber. As a result, as such an apparatus moves through a field of mown hay, the latter is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged with an ejection means adjacent the exit end of each of the die cells to break the respective extrusions of hay into hay wafers of substantially uniform length, which then preferably fall upon a conveyor means for removal from the apparatus.

In an apparatus of the type aforementioned, a delivery chute of the pick-up mechanism has been connected to the hopper to one side thereof and of the axis of rotation of the multiple flight feed auger contained therein. Thus, the respective flights of the feed auger alternately or successivey rotate into and through the area of the hopper receiving the hay and pick up the latter for feed to the wafering chamber. Hence, the delivered hay may be unequally distributed to the respective flights of the auger and, through the feeding action of the latter, unequally distributed to respective ones or groups of the annular series of die cells communicating with the wafering chamber. This is particularly true when, for one reason or another, hay is being delivered to the hopper at rates or in quantities less than that for which the apparatus was designed resulting in a particular group or, in any event, less than all of the individual die cells of the annular series thereof being fed more hay from the auger and more wafers formed therefrom than from other die cells. As will be readily apparent, such a condition results in overworking certain ones of the die cells resulting in inordinate wear thereof and a decrease in the production rate of the wafers and the overall efficiency of the apparatus.

In addition, in prior apparatus of the type aforementioned, the hay mixture picked up and delivered by the aforementioned pick-up mechanism is entrained in or accompanied by an air stream traveling at considerable velocity due to the action of the rapidly rotating flails or arms of the pick-up mechanism. It has been found that, if this air stream or at least a substantial portion thereof is not separated from the hay being delivered to the hopper, a back pressure will build up in the latter retarding to a substantial extent further continuous supply of hay thereto by the rotary flail pick-up mechanism or the like. As a consequence, relatively elaborate arrangements have been made heretofore to separate the air stream from the hay prior to its delivery to the hopper.

For example, means have been provided in connection with the delivery chute associated with the pick-up mechanism aforementioned for separating the air stream from the hay propelled through the delivery chute and diverting or venting such air stream from the chute. In other instances, often in combination with the venting arrangement aforementioned, various vent openings have been provided in other portions of the apparatus and even in a side wall portion of the hopper alongside the feed auger therein which, of course, is not too satisfactory since hay may be lost therethrough either while delivering hay to the hopper or during the feeding action therefrom under the influence of the feed auger, or both.

In view of the foregoing considerations, the present invention contemplates an improved method and apparatus for making compressed hay wafers and of the general type aforementioned in that it comprises an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, and particularly characterized by a rotatable feed hopper means drivingly connected to the aforementioned rotary hay compaction or compression means for rotation with the latter and including at one end thereof a plurality of feed nozzles each communicating with the wafering chamber, and means for delivering hay to be wafered into the other end of the hopper for feed in separate flow paths through the feed nozzles into the wafering chamber for operation upon by the rotary hay compaction or compression means in forming wafers.

More specifically in this regard, the invention is further characterized by the fact that the aforementioned wafering chamber and its associated annular series of die cells in adapted to be disposed in substantially a horizontal plane with the axis of rotation of the rotatable feed hopper means including the feed nozzles thereof disposed substantially perpendicular to such plane, the nozzles diverging from one end of the hopper downwardly and outwardly relative to the axis of rotation of the feed hopper means to feed hay therethrough in physically separate flow paths and lay it in annular separate rows in the wafering chamber in advance of the rotary hay compaction means. As a consequence, the rotary feed hopper means including the feed nozzles thereof in essence combines the functions of the separate feed hopper and rotatable feed auger means of prior apparatus of this type while, at the same time, resulting in relatively uniform distribution of hay to be wafered upon the entrance ends of the die cells in the wafering chamber.

In addition, and referring to yet another more specific aspect of the invention, the latter is further characterized by the fact that the aforementioned rotatable feed hopper includes an open end thereof opposite the feed nozzles, and a pick-up mechanism is provided for picking up and delivering hay to be wafered in an accompanying air stream to a delivery chute having a discharge end radially spaced within the aforementioned open end of the rotatable feed hopper to define therebetween an annular vent opening, whereby at least a portion of the air stream may be separated from the hay and vented from the hopper to atmosphere through the aforementioned vent opening while the hay including any remaining portion of the air stream is fed through the aforementioned feed nozzles to the wafering chamber.

In this regard, the invention is further characterized by a housing surrounding and radially spaced from the aforementioned rotatable feed hopper means including its feed nozzles, and having one end thereof communicating with the wafering chamber and the other end thereof communicating with atmosphere to provide an additional vent for the wafering chamber, whereby any remaining portion of the air stream accompanying the hay while it is fed through the feed nozzles to the wafering chamber may be vented from the latter.

In order to facilitate an understanding of the invention, a preferred embodiment thereof will now be described with reference to the accompanying drawing in which:

FIGURE 1 is a perspective view of a hay wafering apparatus illustrating a preferred embodiment of the invention;

FIGURE 2 is an enlarged fragmentary vertical sectional view through the apparatus of FIGURE 1 illustrating certain details thereof; and FIGURE 3 is a sectional view, partially broken away to illustrate certain details, taken on line 3—3 of FIGURE 2.

Referring now to the drawing, the numeral 10 in FIGURE 1 generally indicates a hay wafering apparatus comprising a frame 12 equipped with the usual ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and includes an output shaft 20 (FIGURE 2) connected in a manner to be described hereinafter to the rotary hay feeding and compaction or compression mechanism of the apparatus, as well as various other instrumentalities of the apparatus as desired. A control pedestal 22 is provided on the frame and mounts at the upper end thereof a control panel having instruments thereon for controlling the engine 18 and other instrumentalities of the apparatus. An adjustable foot 24 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogenous mass. As the apparatus is towed along the field, the hay in a given windrow is adapted to be picked up in a suitable pick-up mechanism preferably of the well known wheeled rotary flail type indicated generally at 26 and comprising a plurality of spaced rapidly rotatable flails or arms which pick up and direct the homogenized hay in an accompanying air stream moving at a relatively high velocity into the delivery chute 28, which delivers the hay and accompanying air stream through a cylindrical discharge end 30 thereof to the upper open end of a vertically disposed rotatable feed hopper means indicated generally at 32 in FIGURE 2 and to be described hereinafter.

Referring now more particularly to FIGURES 2 and 3, it may be seen that the engine output shaft 20 is connected in any well known manner, as by gearing or the like disposed in housing 34 disposed beneath the housing 36 for the wafering apparatus to be described, to a vertically disposed drive shaft 38 which extends through the bottom wall 40 of the housing 36 to the interior of the latter, and is suitably rotatably supported therein by bearing means 41 mounted on a floor member 42 within the housing 36. A pair of spaced horizontally radially extending arms 44 have their central portions suitably rigidly secured to the drive shaft 38 for rotation therewith within a wafering chamber 46 immediately above floor member 42, and have journaled at the respective opposite ends thereof a rotatable compaction or compression roller 48 which travels in rotative paths within the wafering chamber.

The rotatable feed hopper means 32 aforementioned comprises a substantially cylindrical tubular hopper body 50 axially aligned with the discharge end 30 of the delivery chute, and including an open upper end 52 radially spaced from and surrounding the discharge end of the delivery chute to form an annular vent opening therebetween. The rotatable feed hopper means further includes a plurality of tubular feed nozzles 54, in this case two in number corresponding to the number of compaction rollers 4, which communicate at one end thereof with the interior of the hopper body 50 and depend and diverge downwardly and laterally from the axis of the latter toward the wafering chamber 46 with the lower open ends thereof respectively terminating immediately in advance of the rotative paths of travel of the respective rollers 48. The rotatable feed hopper means 32 including the hopper body and feed nozzles is suitably rigidly secured for rotation with the rollers 48 and coaxially of the drive shaft 38 as for example, by welding to the upper tapered end of the drive shaft as indicated in FIGURE 2. A housnig member 56 is suitably rigidly secured to the housing 36 so as to be radially spaced from and surround the rotatable feed hopper means 32, and includes a lower cylindrical wall portion 58 defining an opening communicating with the wafering chamber 46 and an upper tapered wall portion 60 forming an annular vent opening between such wall portion and the upper end of the hopper body 50.

At this juncture it may be noted that, as hay in an accompanying air stream is delivered from the discharge end 30 of the delivery chute into the upper open end of the hopper body 50, at least a portion of such air stream is separated from the hay and vented to atmosphere through the annular vent opening between the delivery chute and upper open end 52 of the hopper body, while the heavier hay particles and any portion of the air stream which may remain or be entrapped thereby travels downwardly within the hopper body and ultimately along two distinct and physically separate flow paths through the feed nozzles 54, and is deposited in successive annular rows in wafering chamber 46 upon the entrance ends of die cells to be described and immediately in advance of the respective paths of rotation of the rollers 48. Furthermore, at least a portion of air remaining in the hay so fed to the wafering chamber or, in other words, not initially vented may then be vented from the wafering chamber through the vent opening to atmosphere between the housing member 56 and the rotatable feed hopper means 32. In this regard, it should be immediately clear from FIGURES 2 and 3 that the secondary vent formed by cooperation between the housing member 56 and rotatable feed hopper means 32 vents substantially the entire wafering chamber 46 in that air may escape not only between the housing member and the external walls of the rotatable feed hopper means, but also from between and around the feed nozzles 54. As a result of this construction, the air stream accompanying the hay delivered through the chute 28 is separated from the hay and vented to atmosphere, thereby preventing any pressure build-up within the apparatus and particularly the rotatable feed hopper means 32 and wafering chamber 46 which might otherwise retard continuous delivery of hay thereto. In addition, as the rotatable feed hopper means rotates, hay will be substantially uniformly distributed within the wafering chamber 46.

The wafering chamber 46, the die cells associated therewith and through which the hay is adapted to be compacted or compressed by the rollers 48 to form extrusions of compacted hay emerging from the exit ends thereof, and the means for breaking wafers from such extrusions and conveying them from the apparatus may be constructed in any one of various known ways, one of which is illustrated in the drawing. Since the details of such construction do not, in and of themselves, form any part of the present invention and are known, a brief description of the nature and operation of these components of the apparatus should suffice for present purposes. In addition, reference may be made to the copending United States patent application Serial No. 194,399 entitled "Hay Wafering Method and Apparatus," filed May 14, 1962 in the names of Merle H. Peterson and Stanley L. Lawrence for further details of such construction.

Thus, the wafering chamber 46 includes a pair of vertically spaced parallel annular die wall members 62 having fixedly disposed therebetween an annular or circumferentially spaced series of knife edges 64. An annular or circumferentially spaced series of pairs of side die wall members 66 and 68 are disposed between the die wall members 62, and have their radially inner ends suitably hingedly connected as indicated at 70 adjacent a radially outward portion of each of the resepctive fixed knife edges 64 so as to diverge radially outwardly therefrom in a V-shaped configuration. Thus, a series of axially open radially extending die cells are formed between the die wall members 62 and the respective oppositely spaced side wall members 66 and 68 of an adjacent pair thereof as will be readily apparent to those acquainted with this art, and the axes of such die cells are contained in a common horizontal plane or a plane parallel with the ground with the entrance ends thereof communicating with the wafering chamber 46. The numeral 72 indicates conventional hydraulically operated motor assemblies of the type comprising relatively reciprocable piston and cylinder elements interposed between each end hinged pair of side die wall members 66 and 68 to control their angular relationship relative to each other and, hence the extent of convergence of the areas of the respective die cells between their entrance and exit ends, each of the motor assemblies being connected in the usual manner through a conduit 74 to a common annular manifold 76 connected to a source of fluid under pressure controlled from the control panel on the control pedestal 22.

As will be apparent, the rollers 48 are positioned closely to but do not engage the knife edges 64. Thus, hay fed continuously from the feed nozzles 54 of the rotatable feed hopper means 32 into the wafering chamber 46 is laid across the knife edges and the entrance ends of the respective die cells in advance of the rotative paths of the respective rollers 48, which rollers compact or compress the hay and force it past the knife edges and into and through the respective die cells upon successive rotative passes thereof to form extrusions of compacted hay emerging from the exit ends of the die cells.

A drive sprocket secured to the drive shaft 38 within the housing 36 is connected through a drive chain 78 to a similar sprocket mounted on a vertical shaft suitably rotatably mounted within the housing 36. A gear wheel 80 secured on the latter shaft engages an annular or circumferentially spaced series of drive pins 82 of an annular conveyor mechanism including a plurality of annular or circumferentially spaced conveyor paddles 84. The conveyor paddles travel in a continuous path about the exit ends of the die cells and along the bottom wall 40 of the housing 36, and are disposed immediately below the horizontal plane of the die cells. A suitable number of spaced break-off tabs 86 each upstand from respective ones of the conveyor paddles 84 and project into the horizontal plane of the die cells so as to be engageable with a radially outer portion of a given extrusion of hay emerging therefrom. As a break-off tab so engages an extrusion of compacted or compressed hay, the latter is caused to bend and break substantially at the exit end of its associated die cell to form a wafer which then drops onto the bottom wall 40 of the housing 36 and is conveyed therealong by the associated conveyor paddle. As will be appreciated, the gear reduction between the drive shaft 38 and the conveyor mechanism aforedescribed and, hence, the timing of the latter is such as to permit a predetermined length of extruded hay to overhang from the exit ends of the die cells before being engaged by a break-off tab.

The hay wafers which fall upon the bottom wall 40 of the housing 36 are moved therealong as aforedescribed until reaching an opening or the like therein, not shown, communicating with one end of the elevator-type conveyor 88 of conventional construction equipped with spaced conveyor paddles 90 which pick up the hay wafers and and convey them from the apparatus, preferably into a trailing conveyance.

The embodiments of the invention in which an exclusive property or privilege is claimed are defined as follows:

1. A method of wafering hay comprising the steps of delivering hay in an accompanying air stream into a feed hopper, separating at least a portion of the air from the hay within said feed hopper and venting it therefrom, feeding the hay and any remaining portion of the air from the hopper along one path into a wafering chamber and upon the entrance ends of an annular series of die cells therein, separating at least a portion of any remaining air from the hay within said wafering chamber and venting it therefrom along a path other than said first-named path, applying force successively to the hay opposite the entrance ends of the die cells to compact the hay into and therethrough to form extrusions of the compacted hay emerging from the exit ends thereof, and breaking the extrusions emerging from the exit ends of the die cells into wafers.

2. A method of wafering hay comprising the steps of feeding hay in an accompanying air stream in a plurality of physically separate flow paths into a wafering chamber and laying it in separate rows upon the entrance ends of an annular series of die cells therein, separating at least a portion of the air from the hay within said wafering chamber and venting it therefrom, applying force successively to the respective rows of hay opposite the entrance ends of the die cells to compact the hay into and therethrough to form extrusions of compacted hay emerging from the exit ends thereof, and breaking the extrusions emerging from the exit ends of the die cells into wafers.

3. A method of wafering hay comprising the steps of delivering hay to an accompanying air stream into a feed hopper, separating at least a portion of the air from the hay within said feed hopper and venting it therefrom, feeding the hay and any remaining portion of the air from the hopper in separate flow paths into a wafering chamber and laying it in separate rows upon the entrance ends of an annular series of die cells therein, separating at least a portion of any remaining air flow from the hay within said wafering chamber and venting it therefrom, applying force successively to the respective rows of hay opposite the entrance ends of the die cells to compact the hay into and therethrough a form extrusions of compacted hay emerging from the exit ends thereof, and breaking the extrusions emerging from the exit ends of the die cells into wafers.

4. A method of wafering hay comprising steps of delivering hay in an accompanying air stream into one open end of a rotatable feed hopper including a plurality of feed nozzles, separating at least a portion of the air from the hay within said feed hopper and venting it from the hopper through said one end thereof, feeding the hay and any remaining portion of the air in separate flow paths through said feed nozzles into a wafering chamber and laying it in separate rows upon the entrance ends of an annular series of die cells therein, separating at least a portion of any remaining air from the hay within said wafering chamber and venting it therefrom, applying force successively to the respective rows of hay opposite the entrance ends of the die cells to compact the hay into and therethrough to form extrusions of compacted hay emerging from the exit ends thereof, and breaking the extrusions emerging from the exit ends of the die cells into wafers.

5. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising feed hopper means having one end thereof communicating with said wafering chamber, means for delivering hay to be wafered in an accompanying air stream into said feeder hopper means for feed therefrom along one patch into said wafering chamber, and vent means venting said wafering chamber to vent along a path other than said first-named path at least a portion of the air fed thereto with the hay, said vent means including a housing surrounding and radially spaced from said feed hopper means, one end of said housing communicating with said wafering chamber and the other end theerof communicating with atmosphere.

6. In an apparatus for making compressed hay wafers, and of the type having an annuar series of die cells including entrance ends thereof circumferentially spaced about and communicating with a wafering chamber in which there is mounted a rotary hay compaction means for compacting hay received within said chamber into and through said die cells to form wafers; the improvement comprising feed hopper means having one end thereof communicating with said wafering chamber, means for delivering hay to be wafered in an accompanying air stream into the other end of said feed hopper means for feed therefrom into said wafering chamber, first vent means for venting at least a portion of the air from said feed hopper means through said other end thereof, and second vent means venting said wafering chamber and at least a portion of any remaining air fed thereto with the hay.

7. The apparatus according to claim 6 in which said other end of said feed hopper means is open to atmosphere, and wherein said means for delivering hay to be wafered in an accompanying air stream includes chute means radially spaced within said other end of said hopper, the radial space between said chute means and said other end of said feed hopper means forming said first vent means.

8. The apparatus according to claim 6 in which said second vent means comprises a housing surrounding and radially spaced from said feed hopper means, one end of said housing communicating with said wafering chamber and the other end thereof communicating with atmosphere.

9. The apparatus according to claim 8 in which said other end of said feed hopper means is open to atmosphere, and wherein said means for delivering hay to be wafered in an accompanying air stream includes chute means radially spaced within said other end of said hopper, the radial space between said chute means and said other end of said feed hopper means forming said first vent means.

10. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising rotatable feed hopper means including nozzle means at one end thereof communicating with said wafering chamber, means for delivering hay to be wafered in an accompanying air stream into said feed hopper means for feed therefrom through said nozzle means into said wafering chamber, and vent means venting said wafering chamber to vent at least a portion of the air fed thereto with the hay.

11. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising rotatable feed hopper means including nozzle means at one end thereof communicating with said wafering chamber, means for delivering hay to be wafered in an accompanying air stream into the other end of said feed hopper means for feed through said nozzle into said wafering chamber, first vent means for venting at least a portion of the air from said feed hopper means through said other end thereof, and second vent means venting said wafering chamber and at least a portion of any remaining air fed thereto with the hay through said nozzle means.

12. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising rotatable feed hopper means including at one end thereof a plurality of feed nozzles communicating with said wafering chamber, means for delivering hay to be wafered in an accompanying air stream into the other end of said feed hopper means for feed in separate flow paths through said feed nozzle into said wafering chamber, first vent means for venting at least a portion of the air from said feed hopper means through said other end thereof, and second vent means venting said wafering chamber and at least a portion of any remaining air fed thereto with the hay through said feed nozzles.

13. The apparatus according to claim 12 in which said feed nozzles diverge from said one end of said feed hopper means and relative to the axis of rotation of the latter toward said wafering chamber.

14. The apparatus according to claim 12 in which said feed nozzles diverge from said one end of said feed hopper means and relative to the axis of rotation of the latter toward said wafering chamber and terminate the exit ends disposed in advance of the path of travel of said rotary hay compaction means to lay hay fed therethrough in said wafering chamber in advance of the path of travel of said rotary hay compaction means.

15. The apparatus according to claim 12 in which said wafering chamber is disposed in a plane substantially perpendicular to the axis of rotation of said feed hopper means.

16. The apparatus according to claim 12 in which said wafering chamber is disposed in substantially a horizontal plane and the axis of rotation of said feed hopper means is substantially perpendicular to said plane.

17. The apparatus according to claim 12 in which said rotatable feed hopper means is drivingly connected to said rotary hay compaction means for rotation with the latter.

18. The apparatus according to claim 12 in which said other end of said feed hopper means is open to atmosphere, and wherein said means for delivering hay to be wafered in an accompanying air stream includes chute means radially spaced within said other end of said hopper, the radial space between said chute means and said other end of said feed hopper means forming said first vent means.

19. The apparatus according to claim 12 in which said second vent means comprises a housing surrounding and radially spaced from said rotatable feed hopper means, one end of said housing communicating with said wafering chamber and the other end thereof communicating with atmosphere.

20. The apparatus according to claim 19 in which said other end of said feed hopper means is open to atmosphere, and wherein said means for delivering hay to be wafered in an accompanying air stream includes chute means radially spaced within said other end of said hopper, the radial space between said chute means and said other end of said feed hopper means forming said first vent means.

References Cited by the Examiner

UNITED STATES PATENTS

| | | | |
|---|---|---|---|
| 1,960,548 | 5/1934 | Pfeiffer | 107—54 |
| 2,065,141 | 12/1936 | Meakin | 107—54 |
| 2,160,302 | 5/1939 | Billows | 107—8.35 |
| 2,777,403 | 1/1957 | Mladek | 107—14 |
| 3,017,845 | 1/1962 | Bonnafoux | 107—14 |
| 3,029,723 | 4/1962 | Schweer | 100—90 X |
| 3,034,421 | 5/1962 | Pence | 100—43 |
| 3,052,192 | 9/1962 | Forth et al. | 107—14 |
| 3,064,811 | 11/1962 | Mumper | 55—459 X |
| 3,153,889 | 10/1964 | Peterson | 56—1 |

FOREIGN PATENTS

| | | |
|---|---|---|
| 1,250,174 | 11/1960 | France. |
| 698,702 | 10/1953 | Great Britain. |

OTHER REFERENCES

Western Livestock Journal, April 1961, pages 36 and 39.

Agricultural Engineering, 2.671.A3, August 1961, pages 412–415 and 423.

WALTER A. SCHEEL, *Primary Examiner.*